(12) United States Patent
Imiya

(10) Patent No.: US 7,765,324 B2
(45) Date of Patent: Jul. 27, 2010

(54) TRANSMISSION APPARATUS AND METHOD, RECORDING MEDIUM, AND PROGRAM THEREOF

(75) Inventor: Daisuke Imiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 10/863,444

(22) Filed: Jun. 8, 2004

(65) Prior Publication Data

US 2005/0033857 A1 Feb. 10, 2005

(30) Foreign Application Priority Data

Jun. 10, 2003 (JP) ............................... 2003-164562

(51) Int. Cl.
*G06F 15/16* (2006.01)
(52) U.S. Cl. ....................... 709/246; 709/231; 709/232; 709/233; 709/235
(58) Field of Classification Search ................. 709/231, 709/232, 233, 235, 246; 370/229, 232
See application file for complete search history.

(56) References Cited

U.S. PATENT DOCUMENTS

| 6,701,372 | B2 * | 3/2004 | Yano et al. ................... 709/232 |
| 6,947,397 | B2 * | 9/2005 | Kim et al. .................... 370/329 |
| 2002/0024999 | A1 * | 2/2002 | Yamaguchi et al. ..... 375/240.03 |
| 2003/0099195 | A1 * | 5/2003 | Lee ............................. 370/229 |
| 2004/0114817 | A1 * | 6/2004 | Jayant et al. ................. 382/239 |
| 2006/0039413 | A1 * | 2/2006 | Nakajima et al. ........... 370/521 |

FOREIGN PATENT DOCUMENTS

| JP | 63-092140 | 4/1988 |
| JP | 05-014876 | 1/1993 |
| JP | 06-350983 | 12/1994 |
| JP | 07-170292 | 7/1995 |
| JP | 10-208393 | 8/1998 |
| JP | 11-308373 | 11/1999 |
| JP | 2000-092064 | 3/2000 |
| JP | 2001-094997 | 4/2001 |
| JP | 2001-326678 | 11/2001 |
| JP | 2002-215516 | 8/2002 |

* cited by examiner

*Primary Examiner*—Karen C Tang
(74) *Attorney, Agent, or Firm*—Finnegan, Henderson, Farabow, Garrett and Dunner, L.L.P.

(57) ABSTRACT

As shown in FIG. 7, the recording medium (e.g., non-transitory computer-readable storage medium) may not only be the removable media 231 having recorded therein a program which includes a magnetic disk (including a floppy disk), an optical disc (including a CD-ROM (Compack Disk-Read Only Memory) and a DVD (Digital Versatile Disk)), a mageto-optical disc (including an MD (Mini-Disk), a semiconductor memory, etc., and is deliver to a user for providing the program independently of the main part of the apparatus, but also be the ROM 222 or a hard disk contained in the storage section 228, on which the program is recorded and which is assembled into the main apparatus beforehand so as to be provided for the user.

6 Claims, 16 Drawing Sheets

F I G. 4
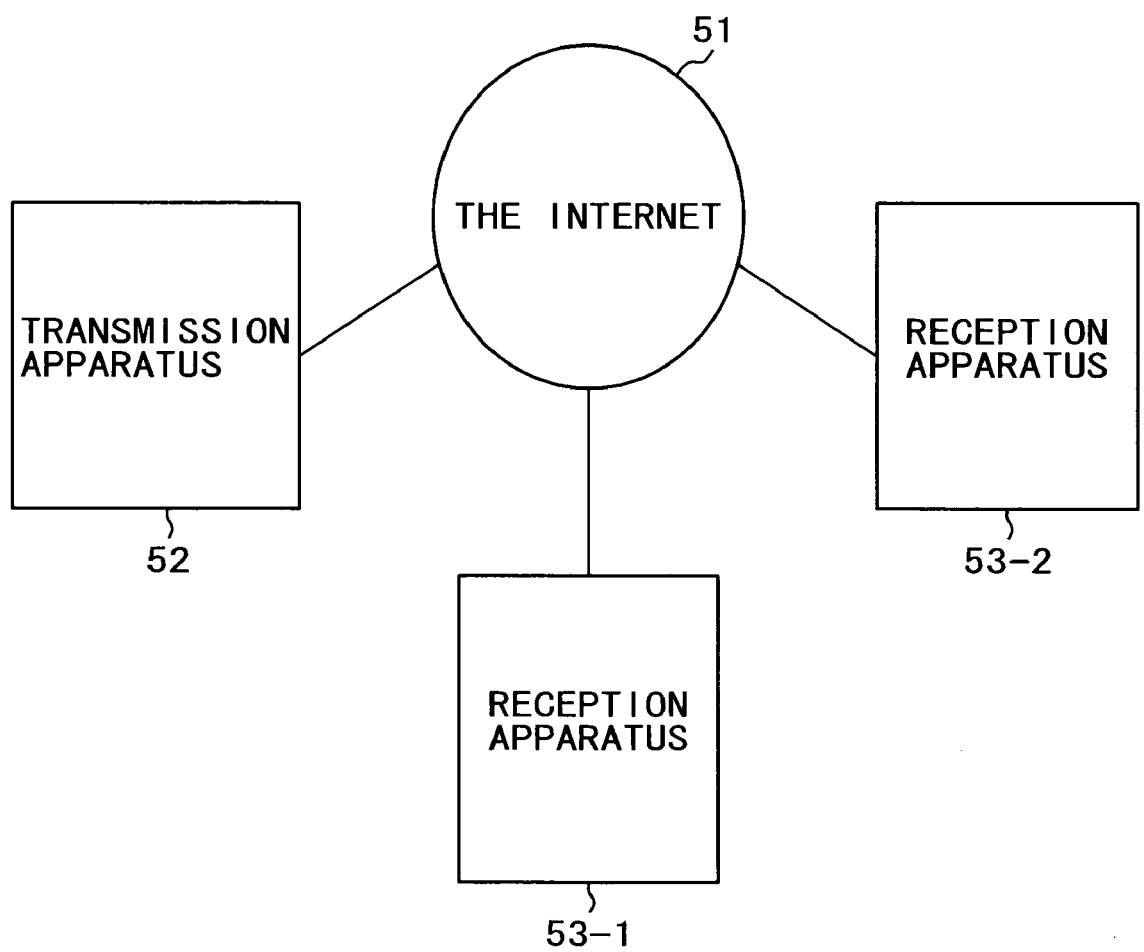

F I G. 6
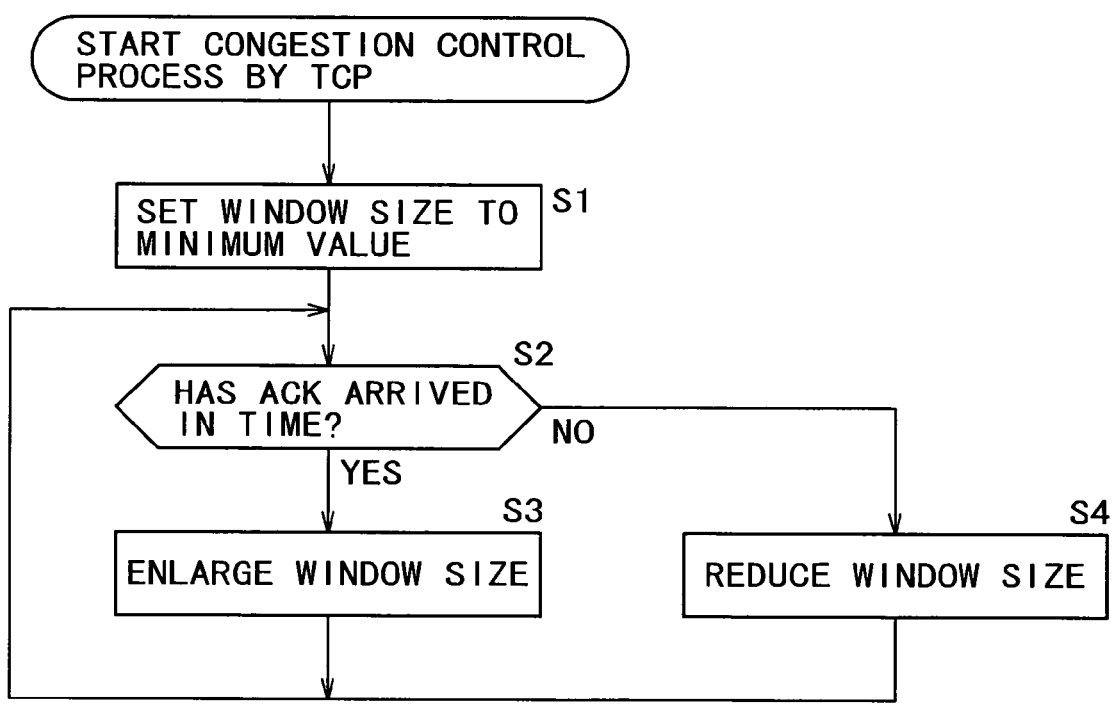

F I G. 9
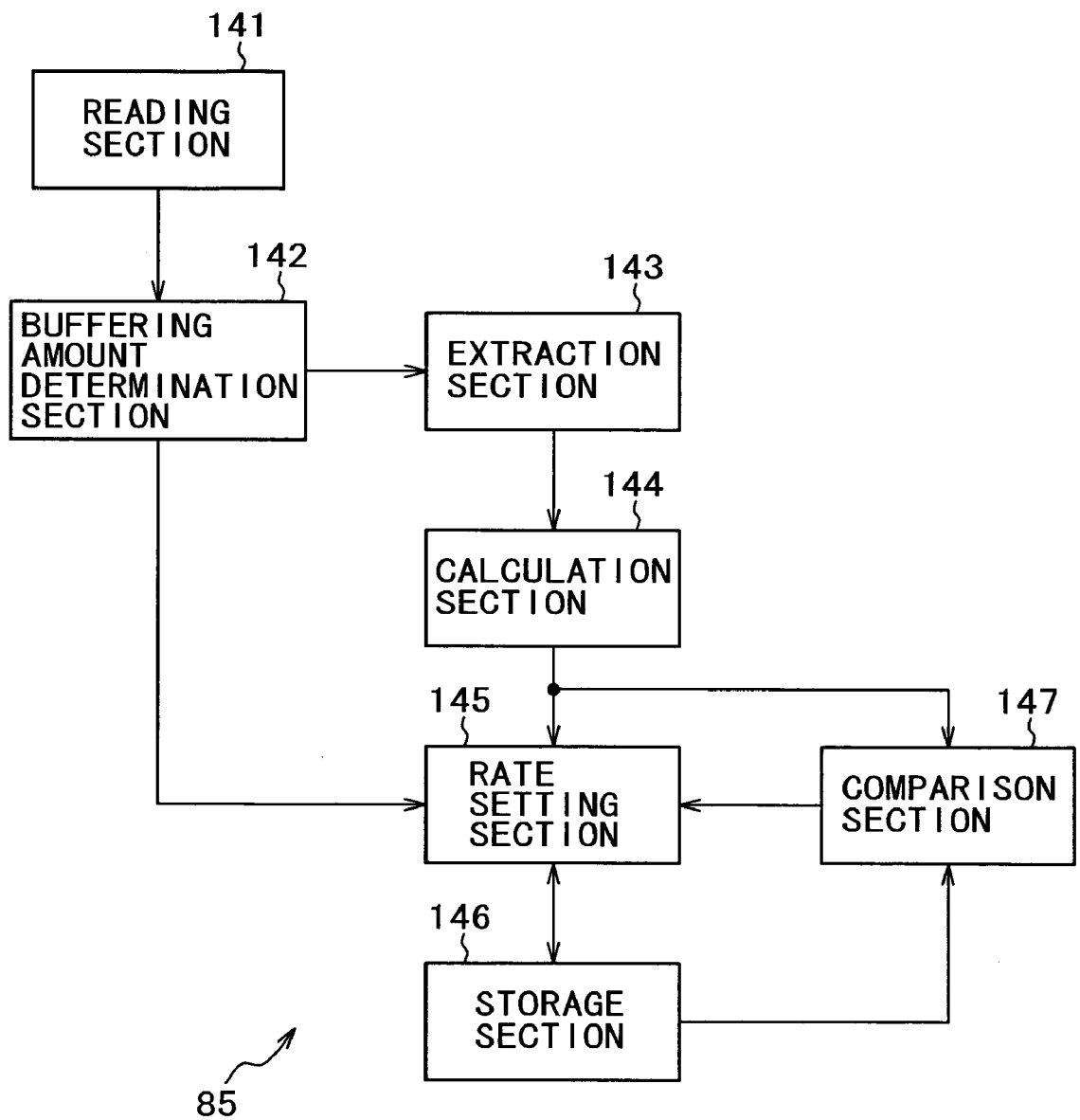

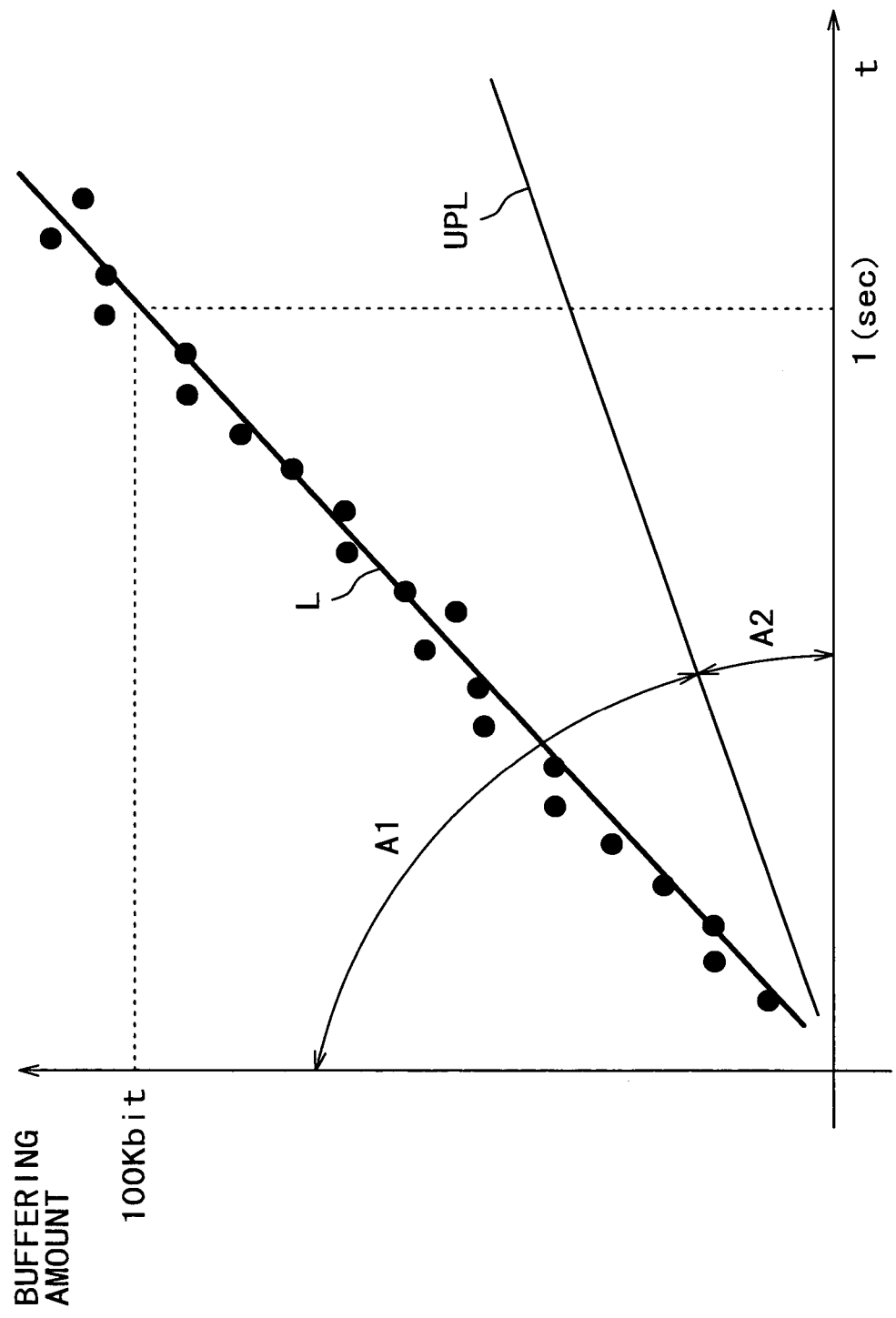

F I G. 1 3
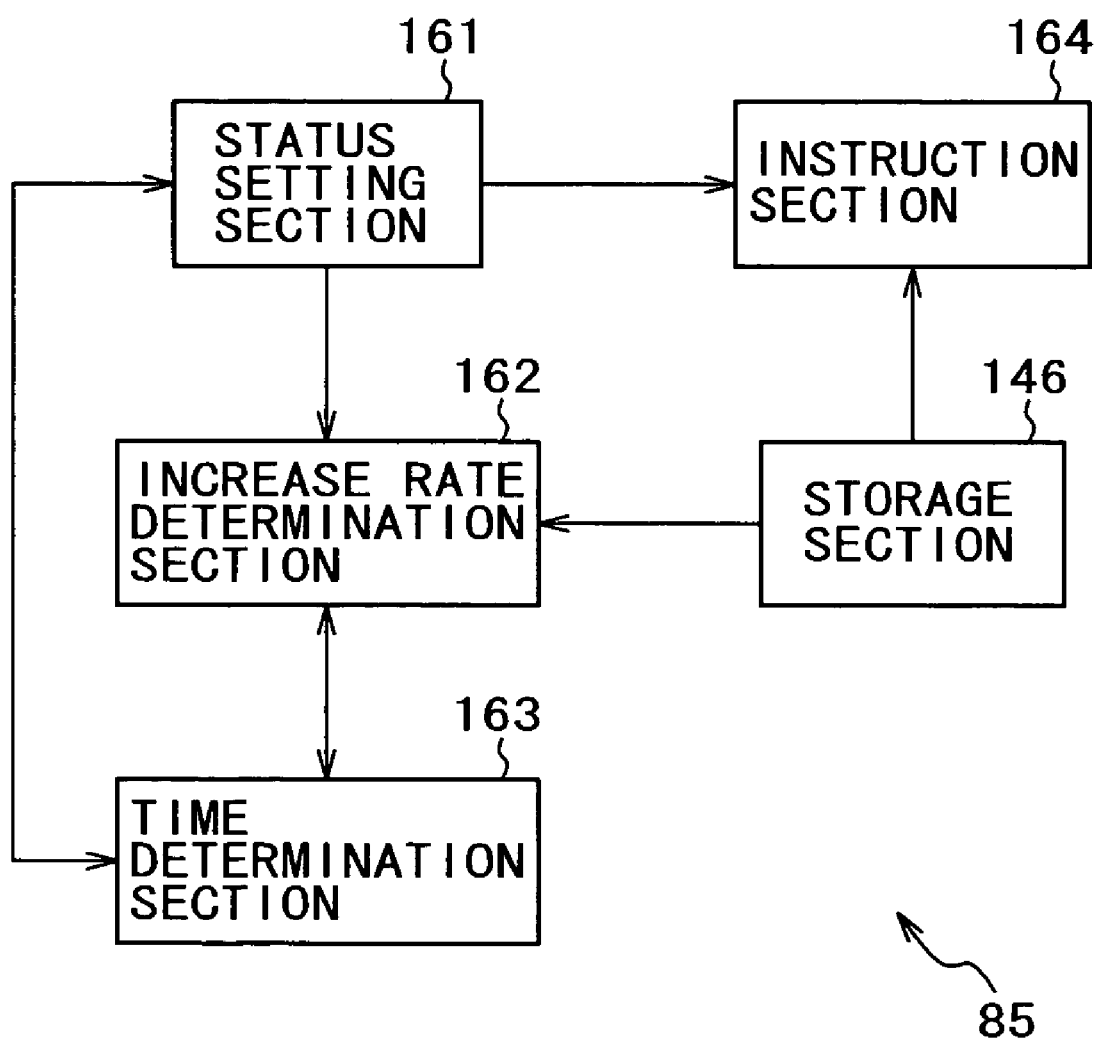

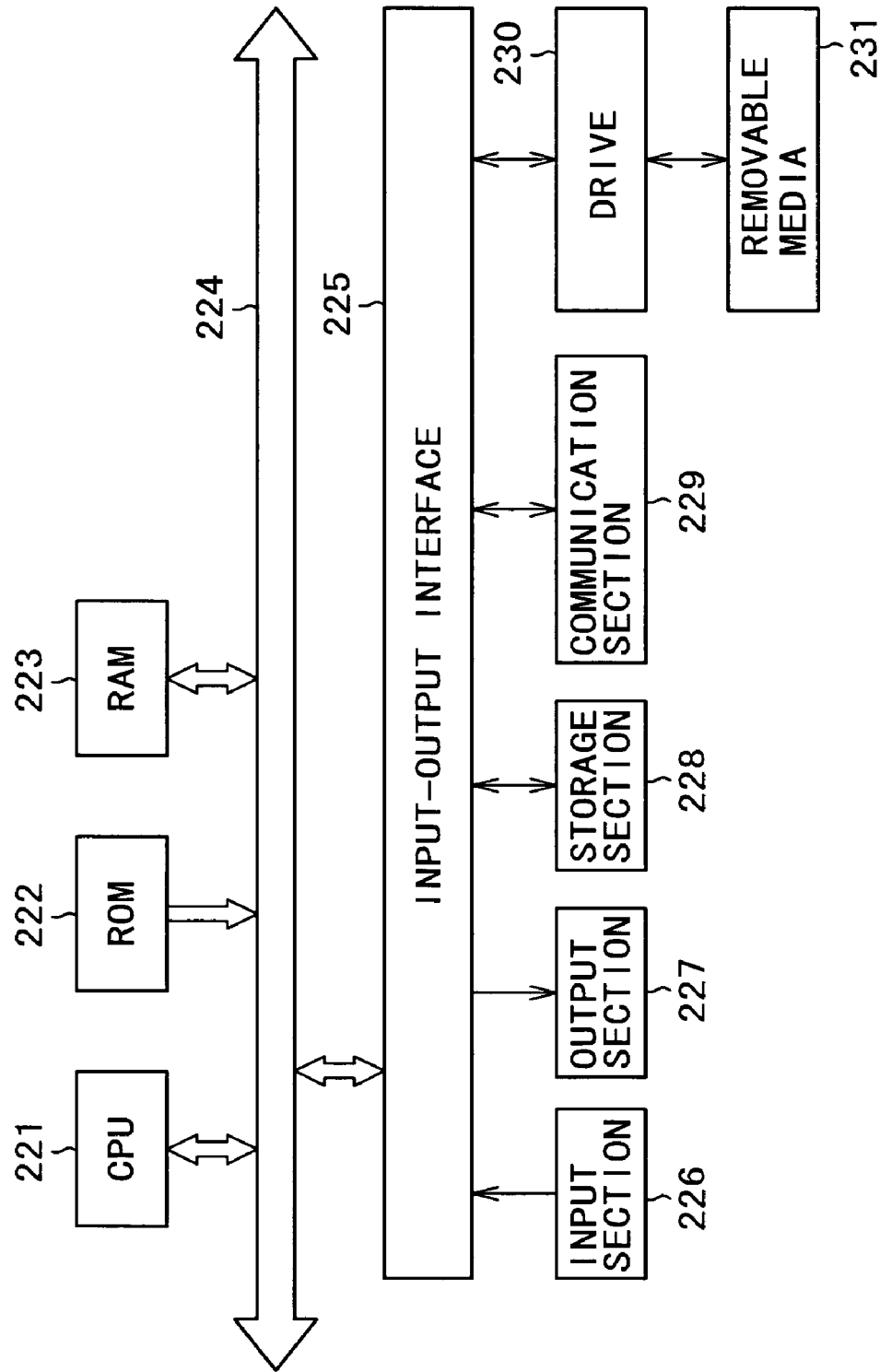

TRANSMISSION APPARATUS AND METHOD, RECORDING MEDIUM, AND PROGRAM THEREOF

CROSS REFERENCE TO RELATED APPLICATIONS

The present document is based on Japanese Priority Application JP2003-164562 filed in the Japanese Patent Office on Jun. 10, 2003, the contents in which being incorporated herein by reference to the extent permitted by law.

BACKGROUND OF THE INVENTION

1. Field of the Invention

The present invention relates to a transmission apparatus and method, a recording medium, and a program product, in particular to a transmission apparatus and method, a recording medium, and a program product which allow mitigating packet losses easily and reliably.

2. Description of the Related Art

The Internet has nowadays become popular and it has become practical to distribute a variety of contents through the Internet. There have been a variety of proposals to solve problems in providing contents through the Internet. For example, in the case of downloading music data, it is proposed, in Japanese Laid Open Patent No. 2002-215516, to effectively download the data in accordance with the current use of a buffer for streaming reproduction by requesting the data to be divided into several portions and transferred in several times because of a limited capacity of the buffer.

On the other hand, if distributing a video data, a method is often used in which the video data is packetized into packets corresponding to the RTP (Real Time Transport Protocol) protocol and then transmitted by way of the UDP (User Datagram Protocol) protocol.

However, if the UDP protocol is used and a firewall 3 exists between a transmission apparatus 1 and a reception apparatus 2 as shown in FIG. 1, it is often the case that the firewall 3 is configured so as not to allow a packet corresponding to the UDP protocol to pass through the firewall 3, so that it is not possible to deliver video data through the Internet by way of the RTP/UDP protocols.

If the video data is communicated between the transmission apparatus 1 outside the firewall 3 and the reception apparatus 2 inside the firewall 3, firstly a connection is established between the apparatuses according to the TCP (Transport Control Protocol) protocol. The video data is delivered over the TCP connection. In the firewall 3, it is often the case that an HTTP (Hyper Text Transfer Protocol) proxy server is in operation. Since the HTTP is an upper layer protocol higher than the TCP and the TCP connection can be established thus allowing access by way of the HTTP protocol. As a result the transmission apparatus 1 can transmit the video data to the reception apparatus 2 through the firewall 3.

SUMMARY OF THE INVENTION

If the transmission apparatus 1 delivers the video data by means of the TCP protocol, the transmission apparatus 1 may be configured as shown in FIG. 2, for example. In other words, an encoder 21 encodes a source video inputted from a video camera (not shown) and supplies the encoded video to a TCP control section 23 through a buffer 22. Based on the TCP protocol, the TCP control section 23 distributes the data inputted through the buffer 22 to the reception apparatus 2 over networks, such as the Internet.

The TCP control section 23 performs a congestion control process. In other words, the TCP control section 23 transmits the data at a bit rate according to a network bandwidth. As a result the bit rate decreases if congestion occurs in the network.

Thus, if the video data is distributed based on congestion control by means of the TCP control section 23, if there is no congestion in the network, an amount of data accumulated in the buffer 22 is small enough as shown in FIG. 2. In contrast, if congestion occurs in the network, a large amount of data is stored in the buffer 22 as shown in FIG. 3.

Since the encoder 21 performs an encoding process at a preset and fixed bit rate, it carries out the encoding process irrespective of the amount of accumulated data in the buffer 22. Consequently, if congestion occurs in the network, the buffer 22 results in overflow and some of the video data to be transmitted to the reception apparatus 2 may be lost.

In view of the above, the present invention has been conceived so as to transmit a video data easily and reliably without missing the video data.

The transmission apparatus according to a preferred embodiment of the present invention is characterized by a detector for detecting a timewise change in the data held at a holding means, and a controller for controlling a transmission rate based on the timewise change detected by the detector.

The detector calculates a gradient of an approximate straight line showing the timewise change in the data as the timewise change in the data.

The controller controls the transmission rate so as to be reduced by an amount corresponding to the gradient.

The controller further increases the transmission rate if the gradient is smaller than a reference value or decrease the transmission rate if the gradient is larger than the reference value.

The transmission apparatus further includes a first comparator for comparing the amount of data held at the holding means with a first reference value. The controller can inhibit the transmission rate from changing if the amount of data held at the holding means is smaller than the first reference value.

The first comparator further compares the amount of data held at the holding means with a second reference value higher than the first reference value. The controller further controls the value of the transmission rate so as to be halved if the amount of data held at the holding means is larger than the second reference value.

A second comparator may be further provided which compares the timewise change detected by the detector with the transmission rate. The controller further controls the value of the transmission rate so as to be halved if the timewise change detected by the detector is smaller than the transmission rate.

A transmission method according to another preferred embodiment of the present invention is characterized by a detection step of detecting the timewise change in data held at the holding means and a control step of controlling the transmission rate based on the timewise change detected by processing the detection step.

A program product of a recording medium according to another preferred embodiment of the present invention is for the transmission apparatus which includes an encoding means for encoding and outputting data at a preset and fixed transmission rate, the holding means for temporarily holding the data encoded by the encoding means, and a transmission means for transmitting the data held at the holding means to an apparatus of the other party over the network by means of a protocol with which an available throughput may be changed according to a state of the network, the transmission apparatus transmitting the data encoded by the encoding means to the apparatus of the other party over the network. The program product is characterized by the detection step of detecting the timewise change in the data held at the holding means and the control step of controlling the transmission rate based on the timewise change detected by processing the detection step.

A program product according to another preferred embodiment of the present invention is for the transmission apparatus which includes the encoding means for encoding and outputting data at the preset and fixed transmission rate, the holding means for temporarily holding the data encoded by the encoding means, and the transmission means for transmitting the data held at the holding means to the apparatus of the other party over the network by means of the protocol with which the available throughput may be changed according to the state of the network, the transmission apparatus transmitting the data encoded by the encoding means to the apparatus of the other party over the network. The program product is characterized by causing a computer to perform the detection step of detecting the timewise change in the data held at the holding means and the control step of controlling the transmission rate based on the timewise change detected by processing the detection step.

According to another preferred embodiment of the present invention, if the encoded data is transmitted to an apparatus of a receiver over the network, the timewise change in the data held at the holding means is detected. Based on the change, the transmission rate of the transmission means is controlled.

As described above, according to the preferred embodiments of the present invention it is possible to transmit the data to the receiver in a reliable fashion. In particular it is possible to distribute the data by means of a simple device at low costs without missing the data.

BRIEF DESCRIPTION OF THE DRAWINGS

The above and other objects and features of the present invention will become more readily apparent to those of ordinary skill in the art from the following detailed description taken in conjunction with the accompanying drawings in which:

FIG. 4 is a block diagram showing an example of a structure of a network system to which the present invention is applied;

FIG. 6 is a flow chart for explaining operation of a TCP control section of FIG. 5;

FIG. 9 is a block diagram showing an example of a functional structure of the rate control section of FIG. 5;

FIG. 12 is a graph showing an example of an approximate straight line;

FIG. 13 is a block diagram showing another example of a functional structure of the rate control section of FIG. 5;

FIG. 17 is a block diagram showing an example of a structure of a computer to which the present invention is applied.

DESCRIPTION OF THE PREFERRED EMBODIMENTS

Hereafter, preferred embodiments of the present invention will be described, and the following are relationships between a constituent element recited in a claim and an example of the preferred embodiments in accordance with the present invention. The description is for confirming that an example which supports the invention recited in the claim is recited in the description of the preferred embodiments of the present invention. Therefore, if there is an example which is recited in the preferred embodiments of the invention and not recited herein as one corresponding to constituent element, it does not mean that the example does not correspond to the constituent element. In contrast, if the example is recited as one corresponding to the constituent element, it does not mean that the example does not correspond to any constituent element other than the constituent elements.

Further, this description does not mean that the invention corresponding to the example recited in the preferred embodiments of the invention is recited in its totality in the appended claims. In other words, this description corresponds to the example recited in the description of the preferred embodiments and does not deny existence of an invention which is not recited in a claim of this application, i.e., it does not constitute disclaimer of inventions that would be possible by dividing into a divisional application or other claims to be added through amendments in the future.

Figure 1:
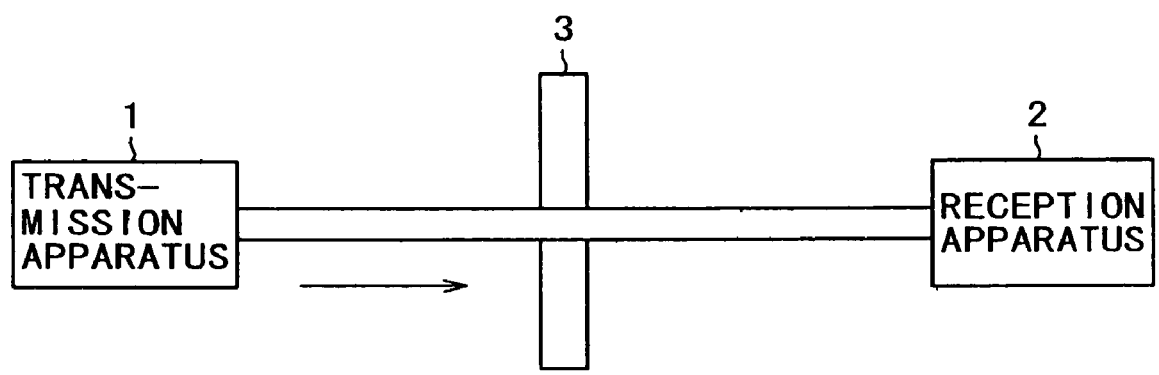
FIG. 1 is a block diagram showing an example of a structure of a conventional communication system.
Figure 2:
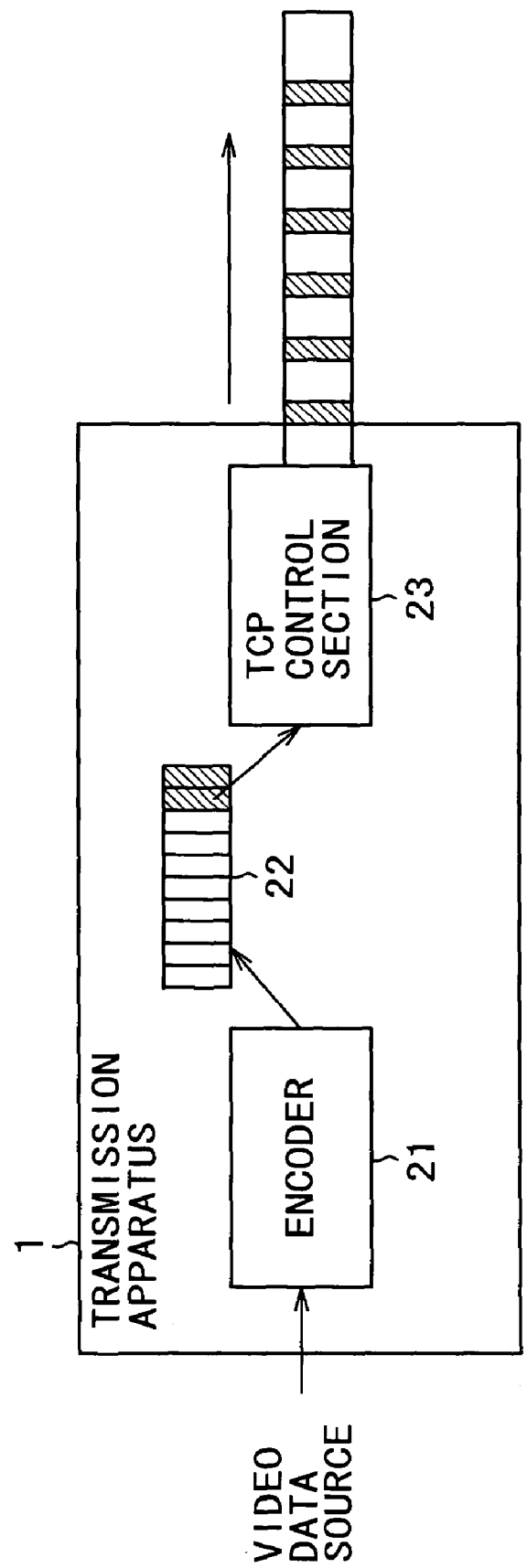
FIG. 2 is a block diagram showing an example of a structure of a transmission apparatus of FIG. 1.
Figure 3:
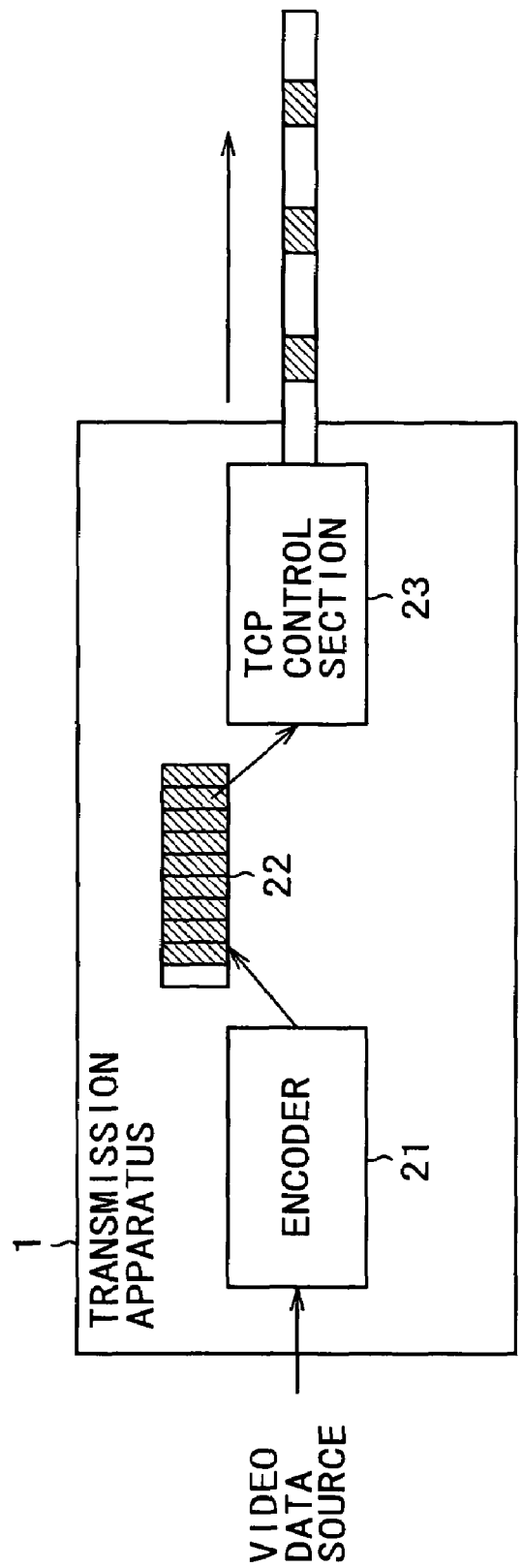
FIG. 3 is a block diagram showing an example of a structure of the transmission apparatus of FIG. 1.
Figure 5:
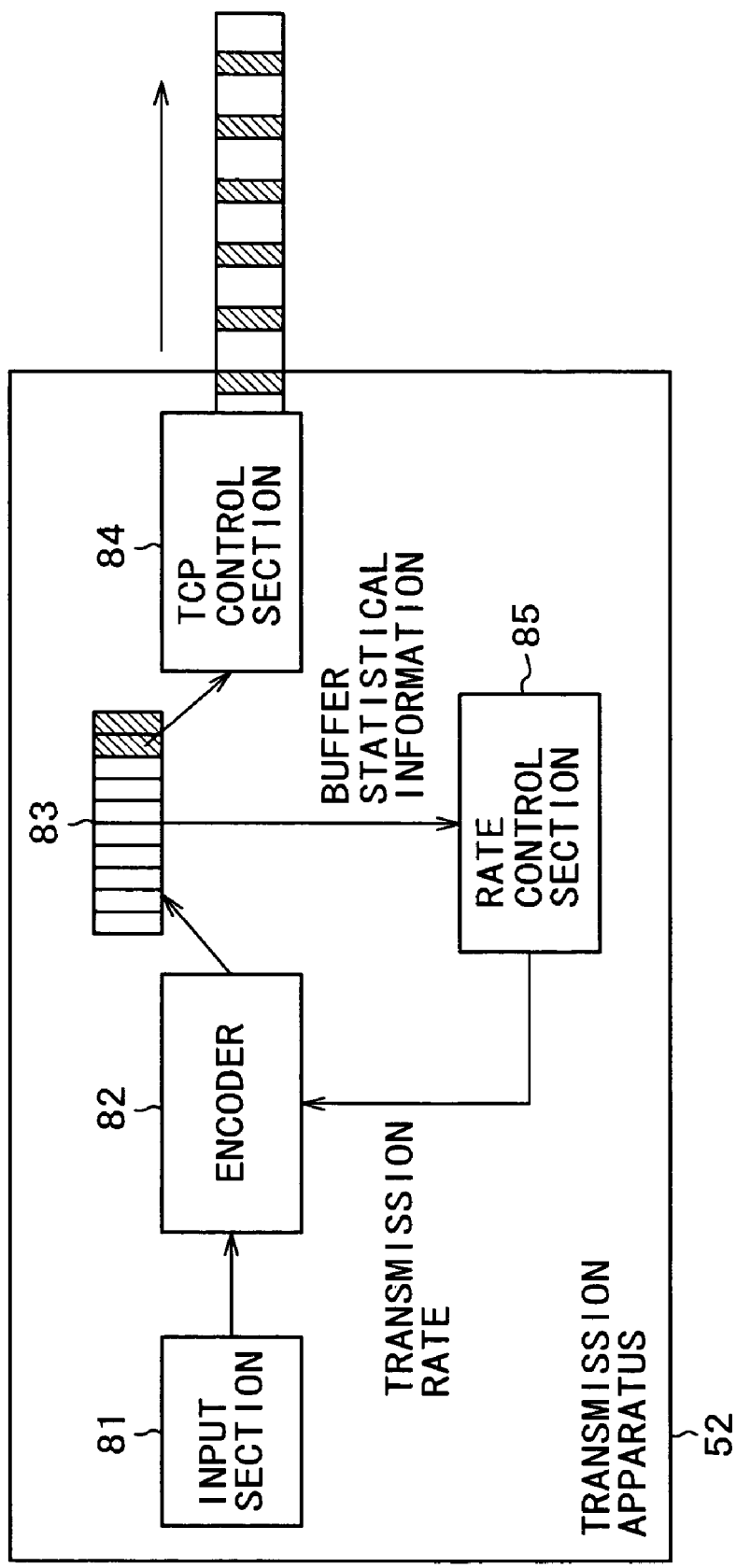
FIG. 5 is a block diagram showing an example of a structure of a transmission apparatus of FIG. 4.

According to a preferred embodiment of the present invention, a transmission apparatus is provided characterized by an encoding means (for example; an encoder 82 as shown in FIG. 5) for encoding and outputting data at a preset and fixed transmission rate, a holding means (for example, a buffer 83 as shown in FIG. 5) for temporarily holding the data encoded by the encoding means, a transmission means (for example, a TCP control section 84 as shown in FIG. 5) for transmitting the data held at the holding means to an apparatus (for example, a reception apparatus 53 as shown in FIG. 4) of the other party over a network (for example, the Internet 51 as shown in FIG. 4) by means of a protocol (for example, TCP) with which an available throughput may be changed according to a state of the network, the transmission apparatus (for example, a transmission apparatus 52 as shown in FIG. 4) transmitting the data encoded by the encoding means to the apparatus of the other party over the network, and the transmission apparatus including a detector (for example, a calculation section 144 as shown in FIG. 9) for detecting a timewise change (for example, a timewise increase) in the data held at the holding means and a controller (for example, an instruction section 164 as shown in FIG. 13) for controlling the transmission rate based on the timewise change detected by the detector.

According to another preferred embodiment of the present invention, a transmission apparatus as recited in the above-mentioned embodiment is characterized in that the detector calculates a gradient (for example, a gradient of the approximate straight line L as shown in FIG. 12) of an approximate straight line showing the timewise change in the data as the timewise change in the data.

Figure 16:
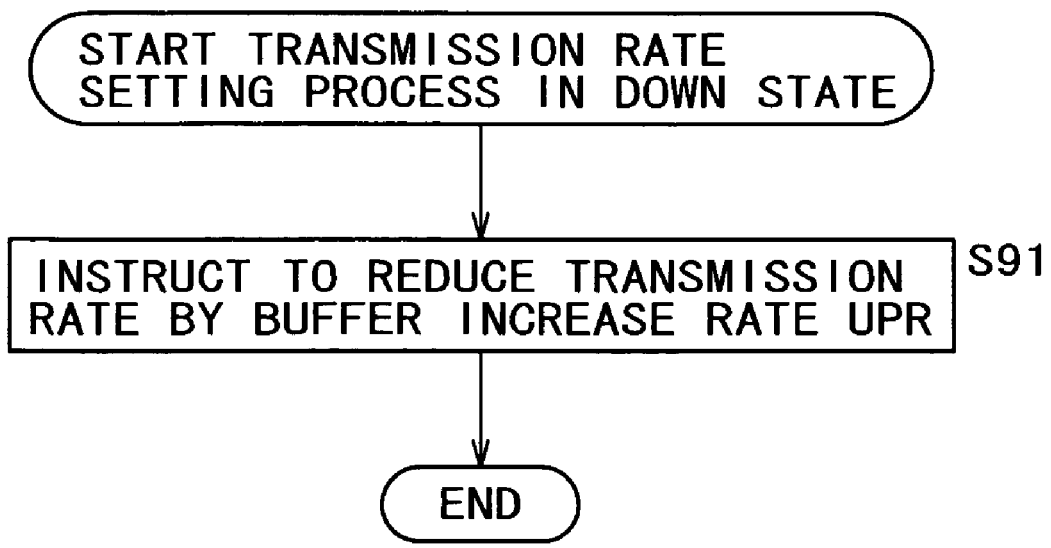
FIG. 16 is a flow chart for explaining the transmission rate setting process in a DOWN state.

According to another preferred embodiment of the present invention, the transmission apparatus as recited above is characterized in that the controller controls the transmission rate so as to be reduced by an amount corresponding to the gradient (so as to be reduced by a buffer increase rate UPR in step S91 of FIG. 16, for example).

According to another preferred embodiment of the present invention, the transmission apparatus as recited above is characterized in that the controller increases the transmission rate (for example, processes of steps S42 and S44 in FIG. 14) if the gradient is smaller than the reference value (for example, a threshold value UPL of FIG. 12) and reduces the transmission rate (for example, processes of steps S47 and S49 in FIG. 14) if the gradient is larger than the reference value.

Figure 10:
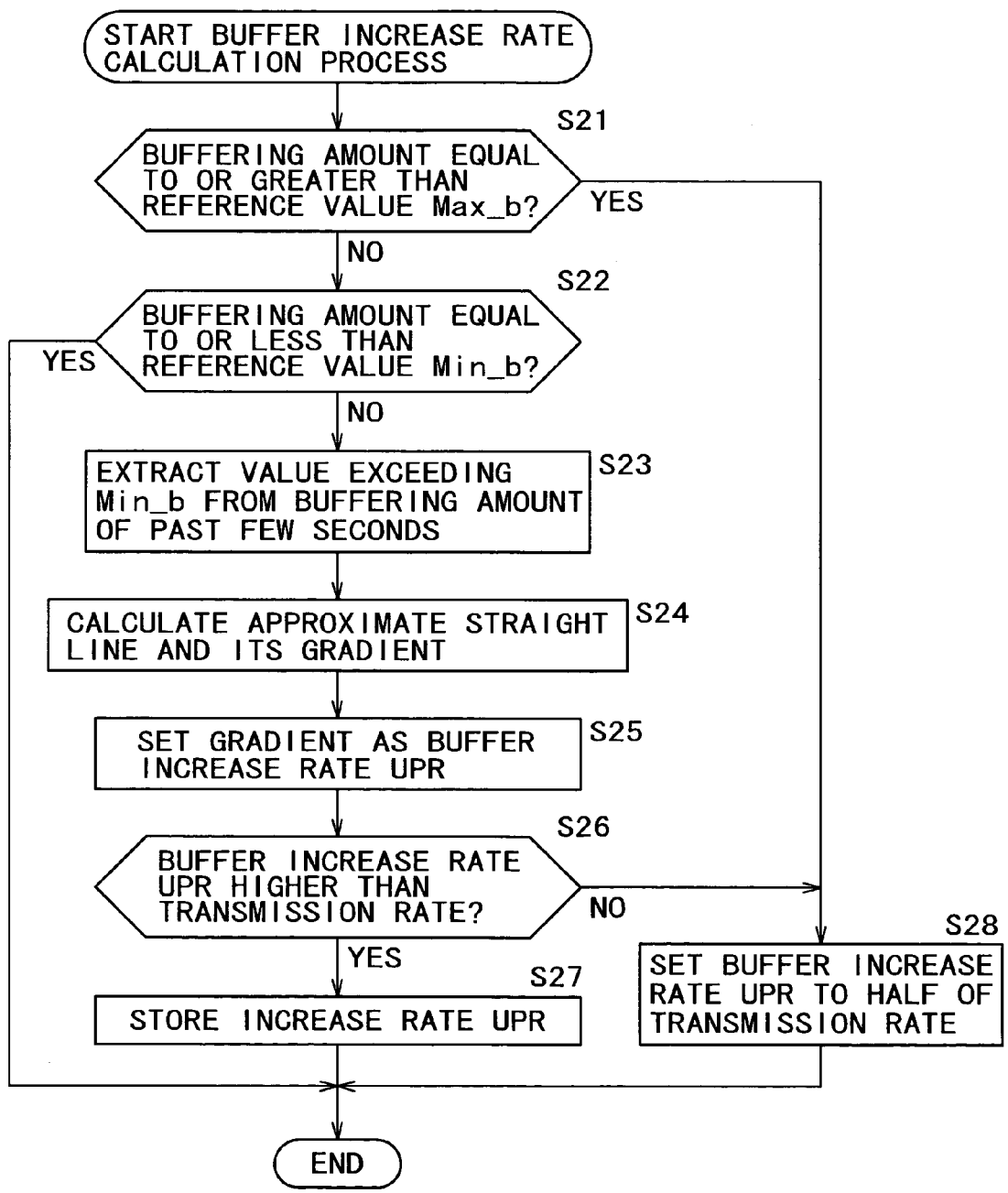
FIG. 10 is a flow chart for explaining an increase rate calculation process of the rate control section of FIG. 5.

According to another preferred embodiment of the present invention, the transmission apparatus as recited above is characterized by further including a first comparator (for example, a buffering amount determination section 142 of FIG. 9 for performing a process of step S22 of FIG. 10) for comparing an amount of data held at the holding means with a first reference value (for example, a reference value Min_b of FIG. 11), and characterized in that the controller inhibits the transmission rate from changing if the amount of data held at the holding means is smaller than the first reference value (for example, the process in step S22 of FIG. 10 which skips steps S23 through S28 if it is determined that the buffering amount is smaller than the reference value Min_b).

According to still another preferred embodiment of the present invention, the transmission apparatus as recited above is characterized in that the first comparator further compares the amount of data held at the holding means with a second reference value (for example, a reference value Max_b of FIG. 11) higher than the first reference value, and the controller controls the transmission rate (for example, performs the process of step S28 in FIG. 10) so as to be halved if the amount of data held at the holding means is larger than the second reference value (for example, if it is determined that the buffering amount is larger than the reference value Max_b in step S21 of FIG. 10).

According to still another preferred embodiment of the present invention, the transmission apparatus as recited above is characterized by further including a second comparator (for example, the buffering amount determination section 142 of FIG. 9 for performing the process of step S26 of FIG. 10) for comparing the timewise change detected by the detector with the transmission rate, and characterized in that the controller controls the transmission rate so as to be halved (for example, performs the process of step S28 of FIG. 10) if the timewise change detected by the detector is smaller than the transmission rate (for example, in step S26 of FIG. 10, if it is determined that the buffer increase rate UPR is smaller than the transmission rate).

According to still another preferred embodiment of the present invention, a transmission method is provided for a transmission apparatus (for example, the transmission apparatus 52 as shown in FIG. 4) which includes an encoding means (for example, the encoder 82 as shown in FIG. 5) for encoding and outputting data at a preset and fixed transmission rate, a holding means (for example, the buffer 83 as shown in FIG. 5) for temporarily holding the data encoded by the encoding means, and a transmission means (for example, the TCP control section 84 as shown in FIG. 5) for transmitting the data held at the holding means through a network (for example, the Internet 51 as shown in FIG. 4) to an apparatus of a receiver (for example, the reception apparatus 53 as shown in FIG. 4) by means of a protocol (for example, TCP) with which an available throughput may be changed according to a state of the network, wherein the data encoded by the encoding means over the network is transmitted to an apparatus of the other party, the transmission method including a detection step (for example, step S24 of FIG. 10) of detecting a timewise change in the data held at the holding means and a control step (for example, steps S25, S27, and S28 in FIG. 10) of controlling the transmission rate based on the timewise change detected by processing the detection step.

According to still another preferred embodiment of the present invention, a recording medium is provided having recorded therein a computer-readable program product for a transmission apparatus (for example, the transmission apparatus 52 as shown in FIG. 4) which includes an encoding means (for example, the encoder 82 as shown in FIG. 5) for encoding and outputting data at a preset and fixed transmission rate, a holding means (for example, the buffer 83 as shown in FIG. 5) for temporarily holding the data encoded by the encoding means, and a transmission means (for example, the TCP control section 84 of FIG. 5) for transmitting the data held at the holding means to an apparatus (for example, the reception apparatus 53 as shown in FIG. 4) of a receiver over a network (for example, the Internet 51 as shown in FIG. 4) by means of a protocol (for example, TCP) with which an available throughput may be changed according to a state of the network, and which transmits the data encoded by the encoding means to the apparatus of the other party over the network, the program product being characterized by including a detection step (for example, step S24 of FIG. 10) of detecting a timewise change in the data held at the holding means and a control step (for example, steps S25, S27, and S28 of FIG. 10) of controlling the transmission rate based on the timewise change detected by processing the detection step.

According to still another preferred embodiment of the present invention, a program product is provided for a transmission apparatus (for example, the transmission apparatus 52 as shown in FIG. 4) which includes an encoding means (for example, the encoder 82 as shown in FIG. 5) for encoding and outputting data at a preset and fixed transmission rate, a holding means (for example, the buffer 83 as shown in FIG. 5) for temporarily holding the data encoded by the encoding means, and a transmission means (for example, the TCP control section 84 as shown in FIG. 5) for transmitting the data held at the holding means to an apparatus (for example, the reception apparatus 53 as shown in FIG. 4) of the other party over a network (for example, the Internet 51 as shown in FIG. 4) by means of a protocol (for example, TCP) with which an available throughput may be changed according to a state of the network, the transmission apparatus transmitting the data encoded by the encoding means to the apparatus of the other party over the network, the program product being characterized by causing a computer to perform a detection step (for example, step S24 of FIG. 10) of detecting a timewise change in the data held at the holding means and a control step (for example, steps S25, S27, and S28 of FIG. 10) of controlling the transmission rate based on the timewise change detected by processing the detection step.

Now, the preferred embodiments of the present invention will be described with reference to the accompanying drawings.

FIG. 4 shows an example of a structure of a network system to which the present invention is applied. In this system, the transmission apparatus 52, reception apparatuses 53-1 and 53-2 are connected to the Internet 51. The transmission apparatus 52 transmits the video data through a video camera (not shown) to the reception apparatus 53-1 and 53-2 over the Internet 51 by way of a real-time delivery.

Although the system of FIG. 4 shows only two reception apparatuses, actually, more reception apparatuses receive the video data delivered by the transmission apparatus 52 through the Internet 51.

The reception apparatuses 53-1 and 53-2 are simply referred to as the reception apparatuses 53 if they are not necessarily distinguished from each other.

FIG. 5 shows an example of a structure of the transmission apparatus 52. An input section 81 is constituted, for example, by a video camera or other imaging apparatus, etc., and images and outputs a video data to be distributed in real time. The input section 81 may naturally receive a video data from any source other than the video camera.

The encoder 82 encodes and outputs the video data inputted through the input section 81 at a preset and fixed bit rate (so that the bit rate of the output may be the preset and fixed bit rate) according to a standard, such as MPEG (Moving Picture Experts Group) 2 and 4, for example.

The video data encoded by the encoder 82 is supplied to the TCP control section 84 through the buffer 83 which holds the video data temporarily. The TCP control section 84 packetizes the video data inputted through the buffer 83 based on TCP and distributes it to the reception apparatuses 53 over the Internet 51. The TCP control section 84 performs a congestion control process according to a state of the Internet 51.

A rate control section 85 detects an amount of change in the data stored in the buffer 83 and controls the value of the preset and fixed bit rate at the encoder 82 so as to be a predetermined value based on the amount of change.

Next, with reference to a flow chart of FIG. 6, a congestion control process in the TCP control section 84 will be described.

Firstly, in step S1 the TCP control section 84 sets a window size W (see FIGS. 7A and 7B) to the minimum value. Next, in step S2 the TCP control section 84 determines whether or not an ACK (Acknowledge signal) has arrived from the reception apparatuses 53 within a preset time period. If the ACK signal arrives within the preset time period, congestion has not occurred on the Internet 51, so that the TCP control section 84 sets the window size W to a larger value in step S3. On the other hand, if it is determined in step S2 that the ACK signal has not arrived within the time period, the process goes to step S4 and the TCP control section 84 sets the window size W to a smaller value.

After the process in step S3 or step S4, the process returns to step S2 and subsequent processes are repeated.

Figure 7A:
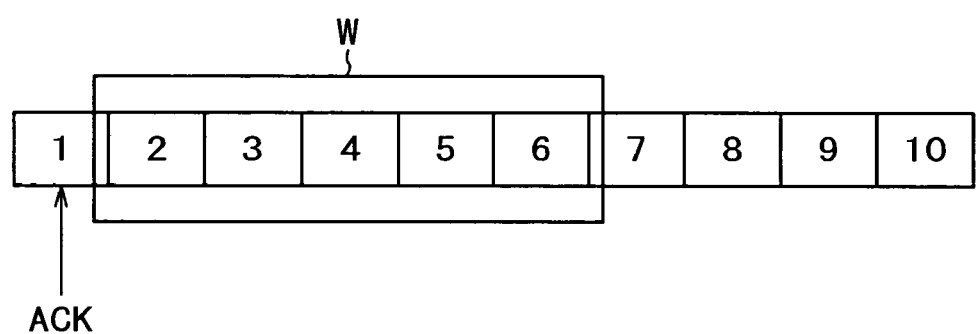
FIGS. 7A and 7B are charts for explaining a window.
Figure 7B:
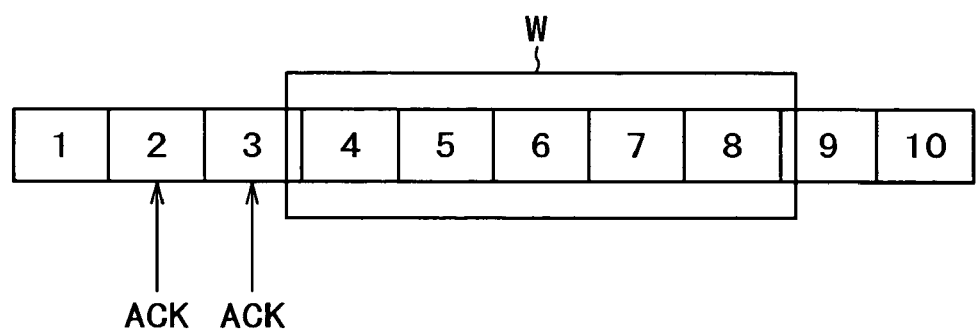

By the window size W we mean an available range at which packets are reliably sent to the receiver even if the packets are sent in advance without waiting until the ACK signal arrives as shown in FIGS. 7A and 7B.

As shown in FIG. 7A, if the ACK signal with respect to a packet 1 returns, five packets 2 through 6 within the window size W can be transmitted before the subsequent ACK signal arrives.

In contrast, as shown in FIG. 7B if the ACK signals corresponding to the packets 2 and 3 return it are possible to transmit the packets 4 through 8 located within the window size W.

The larger the window size W is, the larger an available bit rate at which packets can be transmitted by means of TCP is. In contrast, as the size of the window size W is reduced, the available throughput at which the packets can be transmitted is decreased. In this way, the congestion control is performed based on a timing of the arrival of the ACK signal.

Accordingly, the TCP control section 84 takes in, through the buffer 83, the video data inputted from the input section 81 and encoded by the encoder 82 and delivers it to the reception apparatuses 53 over the Internet 51.

If the Internet 51 is congested, the TCP control section 84 sets the window size to a smaller value as a time interval between the ACK signals received from the reception apparatuses 53 becomes longer. On the other hand, if the ACK signal is received within a time limit, the window size is enlarged to control the rate. In this case, therefore, there is similarly a possibility that the buffer 83 may overflow if the Internet 51 is congested, because the encoder 82 encodes and outputs the video data inputted from the input section 81 at the preset and fixed rate.

Thus, in accordance with the present invention, the rate control section 85 detects a change in the amount of data stored in the buffer 83, and controls the transmission rate of the encoder 82 according to the detection results.

Figure 8:
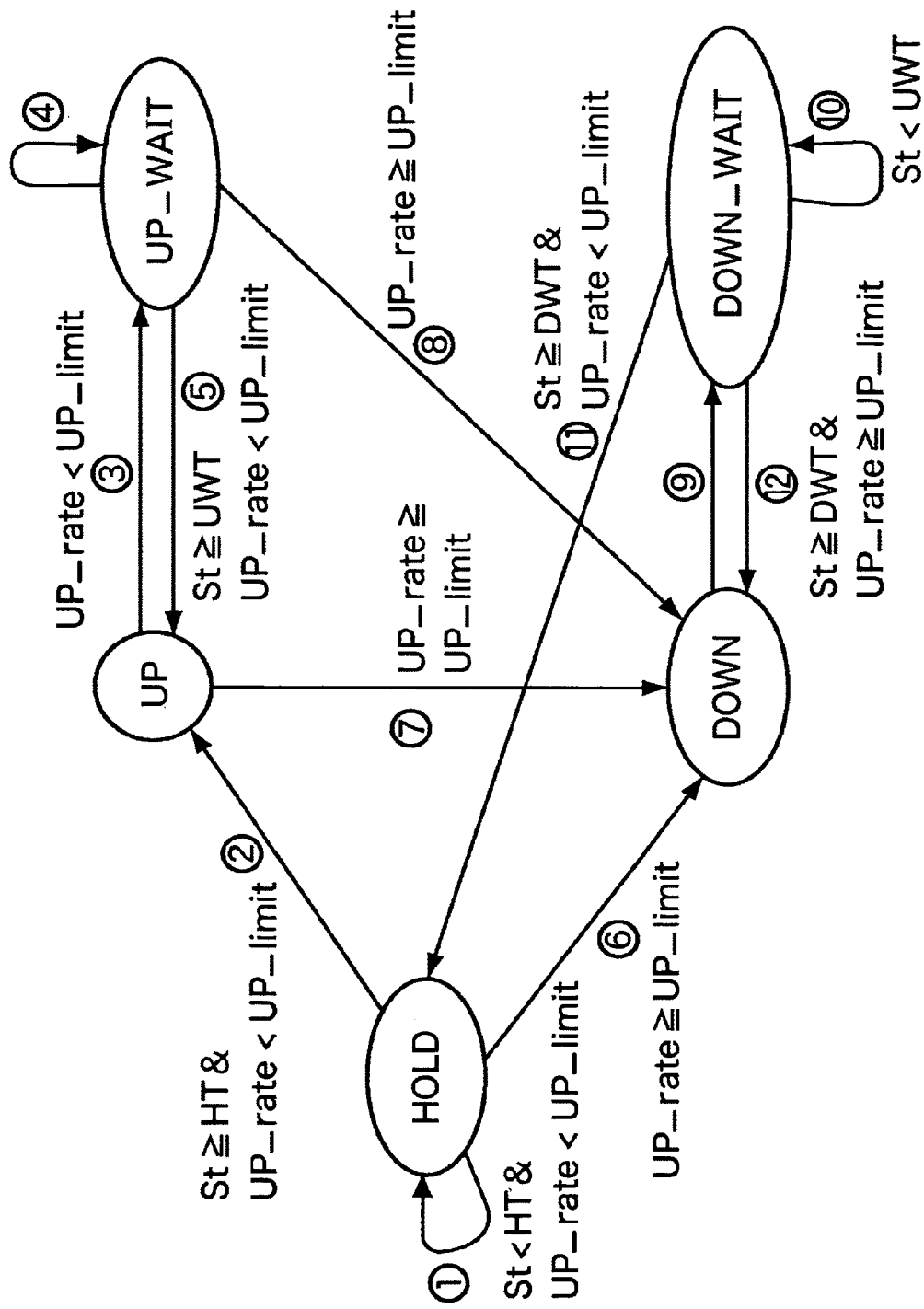
FIG. 8 is a state transition diagram showing state transitions in a rate control operation of a rate control section of FIG. 5.

A state transition diagram of FIG. 8 shows transitions of states where the rate control section 85 performs the rate control. As shown in FIG. 8, in this example, five states which are a HOLD state (HOLD), an UP state (UP), a DOWN state (DOWN), a UP_WAIT state (UP_WAIT), and a DOWN_WAIT state (DOWN_WAIT) are prepared. These states will particularly be described with reference to a flow chart of FIG. 14. The state changes from a predetermined state to another state based on an increase rate UPR (UP_rate) of the video data stored in the buffer 83. The rate control section 85 has a functional structure as shown in FIG. 9 in order to calculate the increase rate UPR of the data in the buffer 83.

A reading section 141 reads an amount of video data stored in the buffer 83 and outputs the read amount to the buffering amount determination section 142. The buffering amount determination section 142 compares the buffering amount read by the reading section 141 with a reference value, and outputs the results of comparing to an extraction section 143. Further, based on the results of comparing the buffering amount with the reference value, the buffering amount determination section 142 controls and causes a rate setting section 145 to set up a predetermined value as the increase rate UPR.

The extraction section 143 stores the video data in the buffer 83 for a predetermined period of time (e.g., for the past few seconds). The extraction section 143 extracts the video data for the past few seconds which is subjected to calculation and supplies the extracted video data to the calculation section 144 if a given determination result is inputted from the buffering amount determination section 142. Based on the video data supplied from the extraction section 143, the calculation section 144 calculates a rate of change of the data. In particular, the approximate straight line represented by the video data is calculated and the gradient of the approximate straight line is calculated.

The rate setting section 145 sets up the increase rate UPR so as to be a value in accordance with the gradient calculated by the calculation section 144. A storage section 146 stores a current transmission rate set up by the rate setting section 145. Based on the transmission rate stored in this storage section 146, the transmission rate of the encoder 82 is controlled.

A comparison section 147 compares in magnitude the increase rate UPR calculated by the calculation section 144 with the current transmission rate stored in the storage section 146 and causes the rate setting section 145 to set up a predetermined value as the increase rate UPR according to the results of the comparison.

Referring now to a flow chart of FIG. 10, a calculation process for the increase rate UPR in the buffer 83 performed by the rate control section 85 as shown in FIG. 9 will be described. This process is periodically repeated at constant and preset time intervals.

Figure 11:
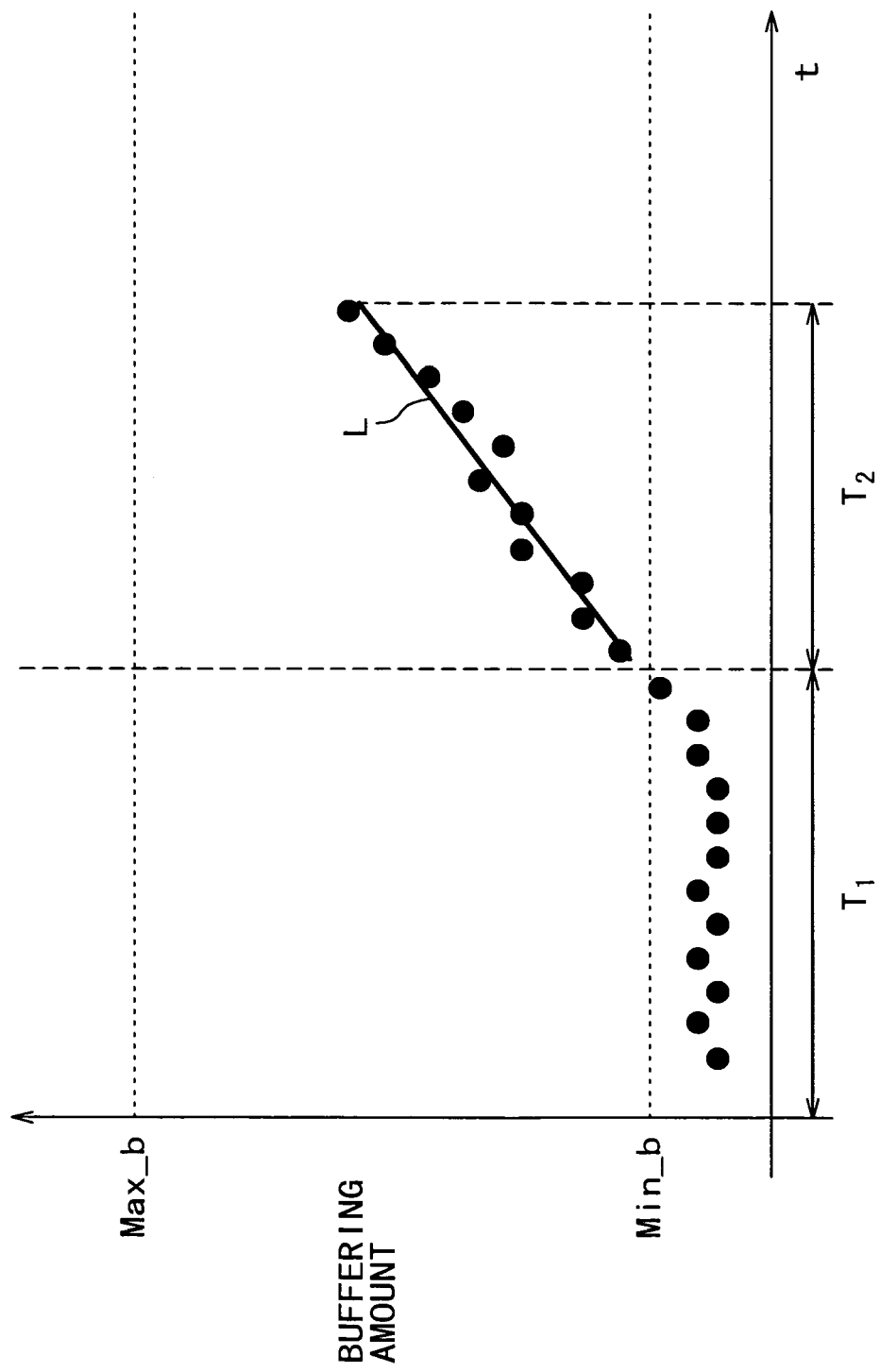
FIG. 11 is a graph for explaining a buffer increase rate.

In step S21 the reading section 141 reads the amount of video data stored in the buffer 83 and supplies the read data to the buffering amount determination section 142 as the buffering amount. The buffering amount determination section 142 determines whether or not the buffering amount read by the reading section 141 is equal to or larger than a preset reference value Max_b. As shown in FIG. 11 this reference value Max_b is set to a value at which the buffer 83 may overflow if exceeding this reference value. In step S21 if it is determined that the buffering amount is equal to or larger than the reference value Max_b, the process moves to step S28 and the buffering amount determination section 142 outputs a control signal to the rate setting section 145. At this stage, the rate setting section 145 causes the storage section 146 to set one half of the value of the currently set transmission rate to the increase rate UPR.

In step S21 if it is determined that the buffering amount read from the buffer 83 is smaller than the reference value Max_b, the process moves to step S22. The buffering amount determination section 142 determines whether or not the buffering amount read from the buffer 83 is equal to or smaller than the reference value Min_b. As shown in FIG. 11 this reference value Min_b is set to a value smaller than reference value Max_b.

In step S22 if it is determined that the buffering amount is larger than the reference value Min_b, the process moves to step S23. The extraction section 143 extracts values which exceed the reference value Min_b from the buffering amounts for the past few seconds.

In an example as shown in FIG. 11, during a period $T_1$ the buffering amount of the buffer 83 is smaller than the reference value Min_b, for example, so that the period is stable and there is substantially no possibility of overflowing. On the other hand, during a period $T_2$ the buffering amount which is the amount of data stored in the buffer 83 becomes progressively larger than the reference value Min_b. In such a case, the values, for the past few seconds, of the buffering amounts which have become larger than reference value Min_b are extracted as shown in FIG. 12.

For example, assuming that the encoder 82 decodes and outputs the video data at 400 kbps and the TCP control section 84 distributes the video data over the Internet 51 at 300 kbps, the video data in the buffer 83 will increase at a rate of 100 kbps. In other words, the 100 kbits of data will be accumulated in the buffer 83 for one second.

In step S24 the calculation section 144 calculates the approximate straight line L of the amounts of buffering extracted by the extraction section 143 and also calculates the gradient of the approximate straight line L as shown in FIG. 12. The approximate straight line L can be found as a straight line by the minimum sum of differences from the amounts of buffering at respective sampling times.

In step S25 the rate setting section 145 sets the gradient calculated by the calculation section 144 by way of the process in step S24 as the increase rate UPR of the buffer 83. The thus calculated and found gradient directly represents the amount of data, per unit of time, which is accumulated in the buffer 83.

Next, in step S26 the comparison section 147 determines whether or not the value of the increase rate UPR calculated by the calculation section 144 is higher than the value of the current transmission rate stored in the storage section 146. If the buffer increase rate UPR is higher than the transmission rate, the process moves to step S27. The comparison section 147 controls the rate setting section 145 and causes the storage section 146 to store the value of the increase rate UPR set up by way of the process in step S25.

In step S26 if it is determined that the buffer increase rate UPR is smaller than the transmission rate, it is not possible to reduce the UPR so as to be lower than the transmission rate in the DOWN state, so that the process moves to step S27. The comparison section 147 controls and causes the rate setting section 145 to set the buffer increase rate UPR to one half of the values of the currently set-up transmission rate (value of the increase rate UPR stored in the storage section 146). Then, the storage section 146 is caused to store the value.

In step S22 if it is determined that the buffering amount is smaller than the reference value Min_b, the processes of step S23 through step S28 are skipped. Accordingly the sampling data in the period $T_1$ as shown in FIG. 11 are added to the data with which the gradient of the approximate straight line L is found, to thereby prevent the gradient of the approximate straight line L from having a value smaller than necessary. In other words, it is possible to find the gradient more correctly.

As the above processes are repeatedly performed at predetermined time intervals, the value of the increase rate UPR of the buffer 83 may be stored in the storage section 146 and updated with the newest value one by one.

In this way, while sampling the increase rate UPR of the video data stored in the buffer 83 at regular sampling intervals, the rate control section 85 controls the transmission rate of the encoder 82 in accordance with the transitions of states as shown in FIG. 8. Thus, the rate control section 85 further includes a functional structure as shown in FIG. 13.

A status setting section 161 sets up any one of five states which are the HOLD state, the UP state, the DOWN state, the UP_WAIT state, and the DOWN_WAIT state as shown in FIG. 8. An increase rate determination section 162 compares the increase rate UPR stored in the storage section 146 as shown in FIG. 9 with the threshold value UPL as a preset reference value and performs a process for determining the increase rate UPR. A time determination section 163 performs a process of comparing elapsed time in each state with a preset reference time in each state. An instruction section 164 instructs the encoder 82 to change the transmission rate.

Figure 14:
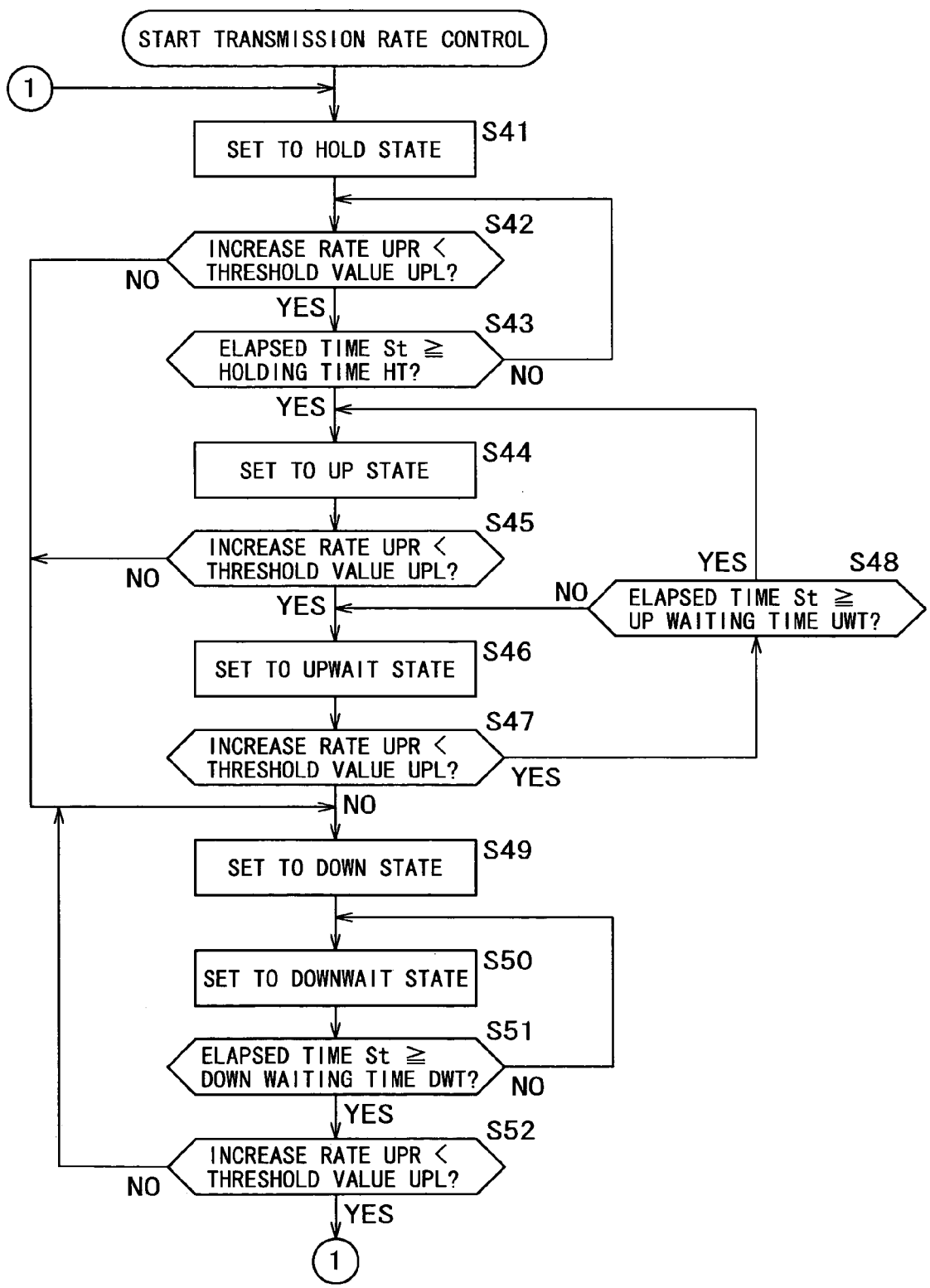
FIG. 14 is a flow chart for explaining a transmission rate control process of the rate control section of FIG. 5.

Next with reference to the flow chart of FIG. 14, a transmission rate control process with respect to the encoder 82 by means of the rate control section 85 will be described. This process is carried out in the transmission apparatus 52 if the encoder 82 encodes the video data supplied from the input section 81 so as to be supplied to the TCP control section 84 through the buffer 83 and distributed from the TCP control section 84 to each of the reception apparatuses 53 over the Internet 51.

In step S41 the status setting section 161 initializes a state to the HOLD state. In step S42 the increase rate determination section 162 determines whether or not the increase rate UPR is smaller than the preset threshold value UPL (Up_limit). The increase rate UPR is stored in the storage section 146 by performing the processes as shown in the flow chart of FIG. 10 at regular sampling intervals. As shown in FIG. 12 the threshold value UPL is the reference value corresponding to the gradient of the approximate straight line L. The occurrence of the predetermined gradient in the approximate straight line L means that data is gradually stored in the buffer 83. However, if the value of gradient is not so large, the transmission rate is made to be a larger value, whereby it is possible to improve transmission efficiencies.

Thus, in step S42 if it is determined that the increase rate UPR is smaller than the threshold value UPL, there is no possibility that the buffer 83 overflows immediately. Accordingly, in step S43 the time determination section 163 determines whether or not an elapsed time St after being set to the HOLD state is larger than a preset holding time HT. If the elapsed time St is smaller than the holding time HT, there is still no possibility that the buffer 83 overflows, so that the process returns to step S42 and it is determined whether or not the increase rate UPR is smaller than the threshold value UPL again. In step S43 if it is determined that the elapsed time St is equal to or larger than the holding time HT, then a time longer than the holding time HT has elapsed in a state where the increase rate UPR is smaller than the threshold value UPL, so that in step S44 the status setting section 161 sets the state to the UP state so as to transmit the data more efficiently. In other words, at this stage, the state changes from the HOLD state to the UP state.

Figure 15:
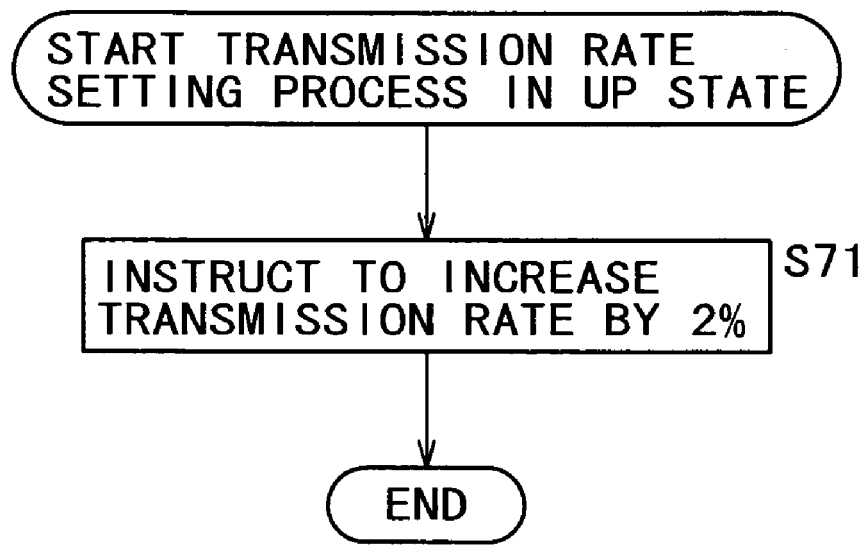
FIG. 15 is a flow chart for explaining a transmission rate setting process in an UP state.

If the instruction section 164 receives, from the status setting section 161, notice that the state has changed into the UP state, it carries out the transmission rate control process as shown in FIG. 15.

In other words, the instruction section 164 instructs the encoder 82 to increase, by two percent, the currently instructed value of the transmission rate which has been issued to the encoder 82.

In addition, naturally the rate to be increased is not limited to two percent but it is possible to set it to any other predetermined value.

As a result, the encoder 82 sets a reference value of the fixed rate to the transmission rate instructed by the rate control section 85. Accordingly, the encoder 82 may carry out an encoding process at a higher speed than hitherto so as to output the data to the buffer 83. Consequently, the increase rate of the buffer 83 may change, the increase rate may be detected by way of the processes of the flow chart of FIG. 10 as described above and may be stored in storage section 146.

In step S45 the increase rate determination section 162 reads the current increase rate UPR from the storage section 146 and compares the increase rate UPR with the preset threshold value UPL. If the increase rate UPR is smaller than the threshold value UPL, it is possible to set the increase rate UPR to a larger value. Then, in this case, the process moves to step S46 and the status setting section 161 sets the state to the UP_WAIT state.

Next, in step S47 the increase rate determination section 162 determines whether or not the increase rate UPR is smaller than the threshold value UPL. If the increase rate UPR is smaller than the threshold value UPL, the process moves to step S48 and the time determination section 163 determines whether or not the elapsed time St after changing into the UP_WAIT state is larger than a preset up-waiting time UWT. If the elapsed time St is smaller than the up waiting time UWT the process stands by until the increase rate UPR of the buffer 83 changes because of the control by means of the TCP control section 84. Thus, the process returns to step S46 again and the status setting section 161 maintains the state at the UP_WAIT state.

In step S47 the increase rate determination section 162 determines again whether or not the increase rate UPR is smaller than the reference value UPL. If it is determined that the increase rate UPR is smaller than the threshold value UPL, the process returns to step S48 and the time determination section 163 determines again whether or not the elapsed time St in the UP_WAIT state has become larger than the up waiting time UWT. If it is determined that the elapsed time St has become larger than the up waiting time UWT, the process returns to step S44 and the status setting section 161 changes the state from the UP_WAIT state to the UP state again.

Thus, the instruction section 164 performs again the process of step S71 in FIG. 15 and controls the encoder 82 so that transmission data is made to be two percent larger than the present transmission rate. Accordingly, the encoder 82 may carry out the encoding process at a still higher speed. Consequently, more data are inputted in the buffer 83.

As the above processes are repeatedly performed, the value of the transmission rate of the encoder 82 is set to a larger value gradually.

In step S47 if it is determined that the increase rate UPR is equal to or higher than the threshold value UPL, there is a possibility that the buffer 83 may overflow, so that the status setting section 161 sets the state to the DOWN state in step S49. This process is also carried out if it is determined in step S45 that the increase rate UPR is equal to or higher than the threshold value UPL in the UP state or if it is determined in step S42 that the increase rate UPR is equal to or higher than the threshold value UPL in the HOLD state.

In step S49 if the DOWN state is set up, the instruction section 164 performs the transmission rate control process as shown in FIG. 16. In other words, at this stage the instruction section 164 instructs the encoder 82 to reduce the transmission rate by the increase rate UPR stored in the storage section 146. Based on this instruction, the encoder 82 sets the transmission rate to be a reference to the value reduced by the increase rate UPR as instructed and performs the encoding process at a fixed rate on the basis of the transmission rate. Therefore, the amount of data supplied to the buffer 83 becomes smaller than before.

In step S49 if the DOWN state is set up, then in step S50 the status setting section 161 automatically changes the state from the DOWN state to the DOWN_WAIT state. In step S51 the time determination section 163 determines whether or not the elapsed time St after being set to the DOWN_WAIT state is larger than a preset down waiting time DWT. If the elapsed time St is smaller than the down waiting time DWT, the process returns to step S50 and the status setting section 161 causes the state to stay in the DOWN_WAIT state.

In step S51 if it is determined that the elapsed time St has become equal to or larger than the down waiting time DWT, the process moves to step S52. In other words, in the DOWN_WAIT state a process is carried out in which only the down waiting time DWT elapses.

In step S51 if it is determined that the elapsed time St has become equal to or larger than the down waiting time DWT, the increase rate determination section 162 determines in step S52 whether or not the increase rate UPR is smaller than the threshold value UPL. At this stage, the DOWN state has been set up in step S49, which means that the transmission rate by means of the encoder 82 is set to a value smaller than before. Also, in this state it is necessary to set the transmission rate to a still smaller value if the increase rate UPR is equal to or higher than the threshold value UPL. Thus, in this case the process returns to step S49 and the status setting section 161 sets the state to the DOWN state again. As a result the instruction section 164 carries out the process of step S91 in FIG. 16 and issues instructions to reduce the transmission rate to a value which is still smaller by the increase rate UPR. Consequently, the amount of data supplied to the buffer 83 from the encoder 82 becomes a still smaller value.

In step S52 if it is determined that the increase rate UPR is smaller than the threshold value UPL, the process returns to step S41 and the status setting section 161 sets the state to the HOLD state. The similar processes as described above will be performed repeatedly.

Independent of the control by means of the rate control section 85, the TCP control section 84 carries out the transmission process of the data corresponding to the state of the Internet 51. This control is performed only based on the congestion state of the Internet 51. In other words, if the Internet 51 is crowded the transmission rate is set to a small value; if it is vacant the transmission rate is controlled to transmit more data. The TCP control section 84 does not monitor the amount of data stored in the buffer 83. Accordingly, if the Internet 51 is crowded, the transmission rate is reduced based on the congestion control which is carried out simply by the TCP control section 84, so that there is a possibility that the buffer 83 may overflow.

At this stage, the rate control section 85 controls the transmission rate of the encoder 82 based on the increase rate UPR of the buffer 83. As a result, the buffer 83 is prevented from overflowing, whereby it becomes possible to distribute the video data to the reception apparatuses 53 reliably and without missing the video data irrespective of the state of the Internet 51.

Further, it is also theoretically possible to unify the TCP control section 84 and the rate control section 85; however, if this is the case an existing device cannot be used as the TCP control section 84. Thus, the rate control section 85 is provided independently of the TCP control section 84, and the rate control section 85 is caused to control the transmission rate of the encoder 82 based only on the increase rate UPR of the buffer 83 irrespective of the situation of the Internet 51. As a result, it is possible to carry out the data delivery simply and reliably at low costs.

In this way, as shown in FIG. 12 the transmission rate is reduced if the gradient of the approximate straight line L is in a range A1 where an angle is larger than that of the threshold value UPL, and increased if it is in a range A2 where an angle is smaller than that of the threshold value UPL.

In the above description although the TCP has been employed as a protocol for distributing the data to the Internet 51, it is also possible to use other protocols, such as 802.11b and the Bluetooth® which are wireless protocols, etc. In effect, these protocols may only be a protocol in which the throughput available on the transmitter side can change according to the state of the network. Further, the data transmitted in accordance with the present invention may be not only video data but also audio data, or other various types of content data.

A series of processes as described above can be performed by means of hardware and also byway of software. In this case, for example, the transmission apparatus 52 is constituted by a personal computer as shown in FIG. 17.

In FIG. 17 a CPU (Central Processing Unit) 221 carries out various types of processes according to a program stored in a computer-readable storage medium, such as a ROM (Read Only Memory) 222 or a program loaded from a storage section 228 to a RAM (Random Access Memory) 223. The RAM 223 suitably stores data etc. required by the CPU 221 if performing various types of processes.

The CPU 221, the ROM 222, and the RAM 223 are mutually connected through a bus 224 to which an input/output interface 225 is also connected.

The input/output interface 225 is connected with an input section 226 constituted by a keyboard, a mouse, etc., an output section 227 constituted by a speaker, a display such as a CRT (Cathode Ray Tube), an LCD (Liquid Crystal display), etc., a storage section 228 constituted by a hard disks etc., and a communication section 229 constituted by a modem etc. The communication section 229 carries out a communication process through a network including the Internet 51.

The input/output interface 225 is also connected with a drive 230, as needed, to which a removable media 231, such as a magnetic disk, an optical disc, a magneto-optical disc, a semiconductor memory, etc., is suitably mounted. A computer program read from the removable media 231 is installed in the storage section 228 as needed.

If the series of processes are performed by way of the software, a program which constitutes the software is installed through the network or a recording medium in a computer built in a dedicated hardware device or, for example, a general-purpose personal computer where various types of functions can be performed by installing various types of programs.

As shown in FIG. 17, the recording medium may not only be the removable media 231 having recorded therein a program which includes a magnetic disk (including a floppy disk), an optical disc (including a CD-ROM (Compact Disk-Read Only Memory) and a DVD (Digital Versatile Disk)), a magneto-optical disc (including an MD (Mini-Disk), a semiconductor memory, etc., and is delivered to a user for providing the program independently of the main part of the apparatus, but also be the ROM 222 or a hard disk contained in the storage section 228, on which the program is recorded and which is assembled into the main apparatus beforehand so as to be provided for the user.

In the specification, the steps which describe the program to be recorded on the recording medium may include not only the processes serially performed in accordance with the described order but also the processes performed in parallel or individually, so that the steps may not necessarily be processed serially.

Further in the specification, by system we mean a whole apparatus including a plurality or group of apparatuses.

What is claimed is:

1. A transmission apparatus comprising:
   an encoder encodes and outputs data at a transmission rate;
   holding means for holding the data encoded by the encoder;
   a transmitter transmits the data held by the holding means to a communication counterpart via a network by means of a protocol having a transmission throughput changeable according to a condition of the network;
   a detector, via a hardware processor, detects a timewise increase in the amount of data held in the holding means during a time period when the amount of data held in the holding means is greater than a first reference Min-b and smaller than a second reference Max-b greater than the first reference Min-b, wherein the detector calculates the timewise increase in the holding means between the first reference Min-b and the second reference Max-b as a gradient of an approximate straight line representing a timewise increase rate of the amount of data in the holding means; and
   a first comparator compares the amount of data held in the holding means with the first reference value Min-b and the second reference Max-b;
   a controller controls the transmission rate based on the timewise increase in the holding means detected by the detector;
   wherein the controller further inhibits changing the transmission rate when the amount of data held in the holding means is smaller than the first reference Min-b and the controller halves the transmission rate when the amount of data held in the holding means is larger than the second reference Max-b.

2. The transmission apparatus according to claim 1, wherein the controller reduces the transmission rate based on the gradient.

3. The transmission apparatus according to claim 1, wherein the controller increases the transmission rate when the gradient is smaller than a reference value UPL and decreases the transmission rate when the gradient is larger than the reference value UPL.

4. The transmission apparatus according to claim 1, further comprising a second comparator compares the timewise increase rate with the transmission rate;
wherein the controller halves the transmission rate when the timewise increase rate is smaller than the transmission rate.

5. A computer-implemented method comprising:
encoding and outputting data at a transmission rate by an encoder;
holding, by a buffer, the data encoded by the encoder;
transmitting the data held by the buffer to a communication counterpart via a network by means of a protocol having a transmission throughput changeable according to a condition of the network;
detecting, via a hardware processor, a timewise increase in the amount of data held in the buffer during a time period when the amount of data held in the buffer is greater than a first reference Min-b and less than a second reference Max-b greater than the first reference Min-b, wherein the hardware processor calculates the timewise increase in the buffer between the first reference Min-b and the second reference Max-b as a gradient of an approximate straight line representing a timewise increase rate of the amount of data in the buffer; and
comparing, by a first comparator, the amount of data held in the buffer with the first reference Min-b and with the second reference Max-b;
controlling, by a controller, the transmission rate based on the timewise increase in the buffer;
wherein the controller inhibits changing the transmission rate when the amount of data held in the buffer is smaller than the first reference Min-b and the controller halves the transmission rate when the amount of data held in the buffer is larger than the second reference Max-b.

6. A non-transitory computer-readable storage medium comprising instructions, tangibly stored on the non-transitory computer-readable storage medium, the instructions, when executed by a computer, performing a method comprising:
encoding and outputting data at a transmission rate by an encoder;
holding, by a buffer, the data encoded by the encoder;
transmitting the data held by the buffer to a communication counterpart via a network by means of a protocol having a transmission throughput changeable according to a condition of the network;
detecting, via a hardware processor, a timewise increase in the amount of data held in the buffer during a time period when the amount of data held in the buffer is greater than a first reference Min-b and less than a second reference Max-b greater than the first reference Min-b, wherein the hardware processor calculates the timewise increase in the buffer between the first reference Min-b and the second reference Max-b as a gradient of an approximate straight line representing a timewise increase rate of the amount of data in the buffer; and
comparing, by a first comparator, the amount of data held in the buffer with the first reference Min-b and the second reference Max-b;
controlling, by a controller, the transmission rate based on the timewise increase in the buffer;
wherein the controller further inhibits changing the transmission rate when the amount of data held in the buffer is smaller than the first reference Min-b and the controller halves the transmission rate when the amount of data held in the buffer is larger than the second reference Max-b.

* * * * *